US012770592B2

(12) United States Patent
Plazak et al.

(10) Patent No.: US 12,770,592 B2
(45) Date of Patent: Oct. 20, 2026

(54) DYNAMIC FILTERED DATA WITHIN MUSIC CREATION PROJECTS

(71) Applicant: Avid Technology, Inc., Burlington, MA (US)

(72) Inventors: Joseph Plazak, Verdun (CA); Daniel Witkowski, Montréal (CA)

(73) Assignee: AVID TECHNOLOGY, INC., Burlington, MA (US)

( * ) Notice: Subject to any disclaimer, the term of this patent is extended or adjusted under 35 U.S.C. 154(b) by 889 days.

(21) Appl. No.: 18/184,139

(22) Filed: Mar. 15, 2023

(65) Prior Publication Data

US 2024/0312440 A1 Sep. 19, 2024

(51) Int. Cl.
*G10H 1/00* (2006.01)
*G10G 1/00* (2006.01)

(52) U.S. Cl.
CPC ............ *G10H 1/0008* (2013.01); *G10G 1/00* (2013.01); *G10H 2210/095* (2013.01); *G10H 2210/105* (2013.01); *G10H 2220/121* (2013.01)

(58) Field of Classification Search
CPC ........... G10H 1/0008; G10H 2210/095; G10H 2210/105; G10H 2220/121; G10G 1/00
See application file for complete search history.

(56) References Cited

U.S. PATENT DOCUMENTS

| | | | | |
|---|---|---|---|---|
| 11,922,911 | B1 * | 3/2024 | Hearn | G10H 1/0075 |
| 2010/0236381 | A1 * | 9/2010 | Ikeda | G06V 30/304 84/477 R |
| 2014/0000438 | A1 * | 1/2014 | Feis | G10G 1/00 84/453 |
| 2015/0095822 | A1 * | 4/2015 | Feis | G06F 3/04842 715/765 |
| 2024/0274022 | A1 * | 8/2024 | Binienda | G09B 5/02 |

OTHER PUBLICATIONS

Finale 2012 User Manual, 2012, https://usermanuals.finalemusic.com/Finale2012Mac/Finale.htm?_ga=2.166945341.204503549.1718731602-1486747731.1718731602.

* cited by examiner

*Primary Examiner* — Jeffrey Donels
(74) *Attorney, Agent, or Firm* — Oliver Strimpel

(57) ABSTRACT

Dynamic user-defined stave filters enable users of scorewriter software applications to generate de-condensed musical parts from condensed scores. When a stave filter is applied to some or all of a stave displaying multiple types of musical element, one or more of the musical element types are hidden from view. Stave filters remove from display note and/or non-note element types. Filtered staves are linked to corresponding unfiltered staves such that compositional changes in a condensed score are reflected in the linked de-condensed staves. Uses include generation of individual parts from a score or generation of different orchestrations or arrangements. Filtered staves are drawn in an intelligent fashion to ensure that musical data are displayed in a musically valid form that conforms to stylistic conventions.

23 Claims, 11 Drawing Sheets

DYNAMIC FILTERED DATA WITHIN MUSIC CREATION PROJECTS

BACKGROUND

Composers of music use scorewriter programs to create musical scores that represent their compositions. Music scored for multiple instruments can have two, three, or even four instruments, or voices, on a single stave. While such a representation may be useful for the composer or for a conductor, it is also desirable to be able to split out the various voices so that each voice appears on a separate stave.

In existing workflows, the process of changing the view of underlying music data from a condensed stave view into a de-condensed stave view is labor-intensive and error-prone. For example, when a condensed stave needs to be separated into multiple parts, there is often a need to customize the individual parts so that they show not only the voice corresponding to that part, but also certain other score items, such as those that can provide context or useful cues for the performer. These customizations are done one object at a time. Furthermore, once score items have been properly customized, additional score items might need to be added to the musical project, and these too would need to be customized individually for the various parts.

There is therefore a need for a streamlined method of manipulating the appearance of music data during the process of music project composition and the production of musical parts.

SUMMARY

In general, a user of a scorewriter application is able to define a stave filter covering some or all of a musical stave. Application of the filter hides certain musical items that are visible so that they are not visible in the filtered stave. The hidden items may be notes or non-note marks. In common use cases, one or more musical voices are filtered to generate a de-condensed stave.

In general, in a first aspect, a method of displaying musical data comprises: at a scorewriter software application, receiving musical data representing a musical project; using the scorewriter software application to display the received data as a first view of the musical data, wherein the first view incudes a stave displaying a plurality of element types of the musical project; enabling a user of a scorewriter software application to define a first filter to be applied to the first view of the musical data, wherein application of the first filter generates a second view of the musical data by removing from the first view a first element type of the plurality of element types of the musical data that is displayed in the first view; and using the scorewriter software application to: apply the first filter to the first view of the musical data to generate the second view of the musical data; and display the second view of the musical data.

Various embodiments include one or more of the following features. The first element type is a first voice of a plurality of voices in the musical project. The first element type is a part of a multi-note or multi-part voice. The first element type is a non-note type. The non-note type is at least one of articulation and dynamics. The first filter applies to a temporal interval comprising a portion of a temporal duration of the musical project. The first filter applies to a duration of the musical project, and a duration of the first filter is automatically changed to match the duration of the musical project when the duration of the musical project is changed. Enabling the user to define a second filter to be applied to the first view, wherein application of the second filter removes from the first view a second element type of the plurality of element types. The second filter overlaps the first filter and both the first element type and the second element type are removed in the second view where the first and second filters overlap. The plurality of element types includes a plurality of musical voices, and the first element type is one or more of the plurality of voices. The first view includes a plurality of staves, and the first filter is defined to be applied to the first view of two or more staves of the plurality of staves. The first view is a condensed stave displaying musical voices for a plurality of players and application of the first filter generates a second view corresponding to a musical part for a subset of the plurality of players. The first view comprises one of a right hand and a left hand of a piano arrangement and the second view comprises a part for one of a soprano, alto, tenor, and bass singer. The first view comprises an edited edition of one or more staves of the musical project and application of a plurality of filters to the first view generates a view comprising an urtext edition of the one or more staves. The first view includes one or more staves of an orchestral score, and application of a plurality of filters to the first view generates a view of an alternative orchestration. The first element type is a note type, and the second view displays at least one note that is stylistically changed with respect to the display of the at least one note in the first view. The stylistic change includes one of a note stem direction, note beam grouping, note beam angle, and note brackets. The second view displays a non-note element that is stylistically changed with respect to the display of the non-note element in the first view. The stylistic change includes one of a placement of rhythm dots, visibility of note articulation, dimension and placement of crescendo and decrescendo hairpins, arpeggio line length, tremolo line length, ledger line visibility, placement of tab stave lines, and visibility of accidentals. At least one musical element that was not present in the first view is automatically added to the second view in order to make the second view musically valid. The at least one musical element is a rest.

In general, in another aspect, a method of displaying musical data comprises: at a scorewriter software application, receiving musical data representing a musical project; using the scorewriter software application to display the received data as a first view of the musical data, wherein the first view incudes a first stave displaying a plurality of element types of the musical project; and enabling a user of a scorewriter software application to: create a second stave linked to the first stave and displaying the first view of the musical data; select a portion of the second stave; and select a filter to be applied to the selected portion of the second stave, wherein application of the filter by the scorewriter software application removes from view in the second stave a first element type of the plurality of element types of the musical data that is displayed in the first view.

In various embodiments, the first stave is a condensed stave that displays a plurality of musical voices and application of the filter to the second stave generates a de-condensed stave that displays a subset of the plurality of musical voices.

In general, in a further aspect, a scorewriter computer program product comprises: a non-transitory computer-readable medium with computer-readable instructions encoded thereon, wherein the computer-readable instructions, when processed by a processing device instruct the processing device to perform a method of displaying musical data, the method comprising: receiving musical data representing a musical project; displaying the received data as a first view of the musical data, wherein the first view incudes a stave displaying a plurality of element types of the musical project; enabling a user of the scorewriter computer program product to define a first filter to be applied to the first view of the musical data, wherein application of the first filter generates a second view of the musical data by removing from the first view a first element type of the plurality of element types of the musical data that is displayed in the first view; applying the first filter to the first view of the musical data to generate the second view of the musical data; and displaying the second view of the musical data.

In general, in another aspect, a system comprises: a memory for storing computer-readable instructions; and a processor connected to the memory, wherein the processor, when executing the computer-readable instructions, causes the system to perform a method displaying musical data, the method comprising: at a scorewriter software application executing on the system, receiving musical data representing a musical project; using the scorewriter software application to display the received data as a first view of the musical data, wherein the first view incudes a stave displaying a plurality of element types of the musical project; enabling a user of a scorewriter software application to define a first filter to be applied to the first view of the musical data, wherein application of the first filter generates a second view of the musical data by removing from the first view a first element type of the plurality of element types of the musical data that is displayed in the first view; using the scorewriter software application to: apply the first filter to the first view of the musical data to generate the second view of the musical data; and display the second view of the musical data.

DETAILED DESCRIPTION

Figure 1:
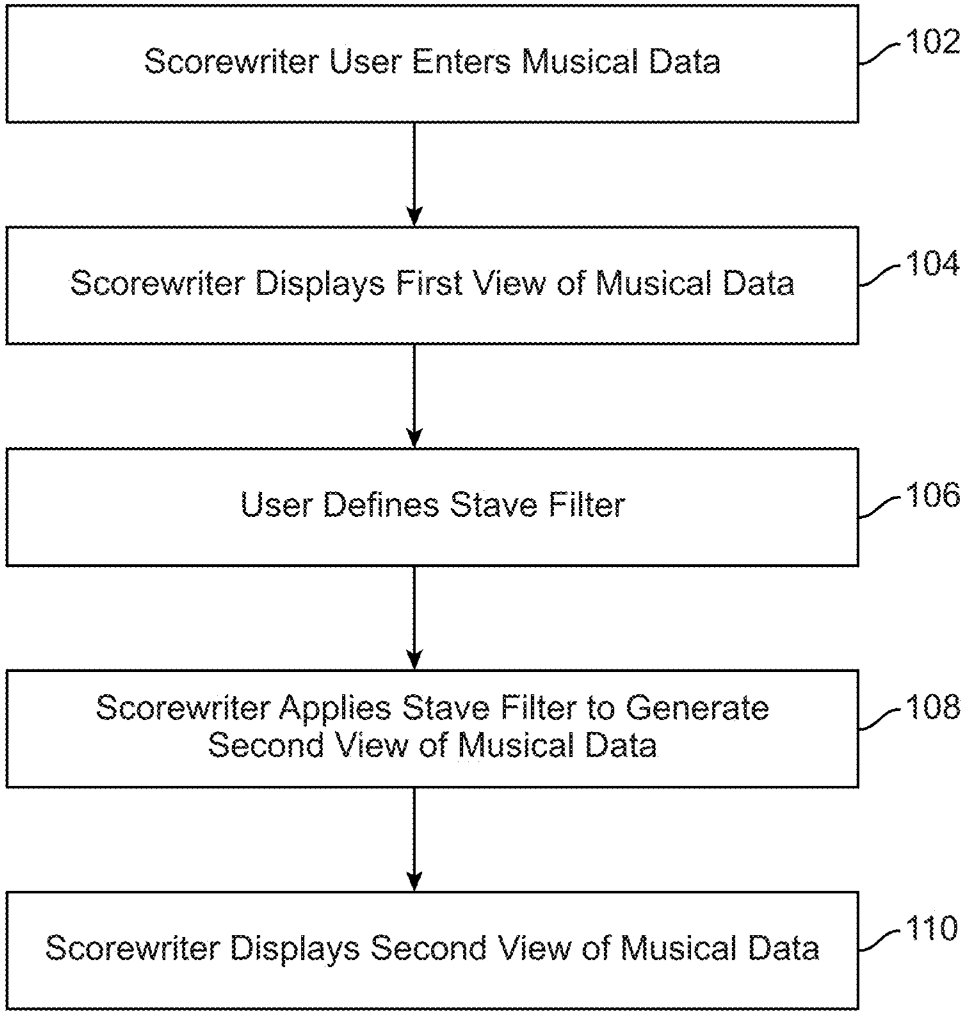
FIG. 1 is a flow diagram illustrating various steps of the musical data display method described herein.

Scorewriter programs generally deploy a standard model view-controller software architecture. This enables the underlying data to be displayed in many ways, with each way providing a different view of the data. The choice of view may affect the way a user interacts with the data using the scorewriter controls. For example, the Sibelius® scorewriter uses a data model that describes musical notes in a singular form, but the view code can represent this data in many forms depending on the musical context. The appearance of a note therefore depends on a combination of the note's internal properties and the various parameters of its context. For example, a note of a given pitch may be displayed in many ways depending on the musical context, which may include different clefs, transposing instruments, enharmonic data, and octave line adjustments.

Existing scorewriter software allows music model data to appear multiple times throughout a project, such as in a full score and in a set of individual instrument parts, and even multiple times within the same view of the music, for example when music data are shared across multiple staves. Such data are referred to as linked or dynamic data, since if it is changed in one view, it also changes in one or more other views. In general, the appearance of linked data in different views is not the same since some customization is applied to change the appearance of a note between views. For example, the same musical data for a single guitar player may be shared and displayed across two distinct types of musical stave, such as notation and tablature.

As mentioned above, when adjusting multiple views of the same underlying data, the affected music items must be customized individually. This process is tedious and error-prone and may need to be carried out multiple times if, for example, a composer decides to add additional score items to a music project. The most common customization involves displaying or hiding from view some musical data items.

We describe herein a method of streamlining the customization process using stave filters. Stave filters provide an additional layer of context that is applied to the underlying music data model, dynamically hiding one or more elements of a stave of music to generate a different view of the score that omits the hidden elements. As used herein, the term "element" refers to an item displayed on a musical score. Element types include, but are not limited to, voices, parts of multi-note voices such as an upper, middle, or lower part, notes, rests, note articulations, dynamics markers, tempo indications, key signatures, and phrasing annotations. A common application of the method is to generate de-condensed stave views of the music. As used herein, a condensed stave is a stave that contains musical data capable of being reduced to a musically meaningful representation displaying a subset of the musical data. In common use cases, a condensed stave is one in which multiple voices or multiple notes belonging to a single voice are represented on a given stave. A de-condensed stave is a stave which contains a meaningful subset of musical data from its parent condensed stave. In common use cases, a de-condensed stave is one in which an individual voice or pair of voices to be played by one or two players is represented on its own stave. For example, a condensed stave may be part of a musical score for an orchestra, such as the strings or woodwind, and a de-condensed stave may be a part for one of the players. As used herein, the term "voice" refers to a musical entity, and in most cases it is the smallest set of musical data items that may be hidden by a stave filter. However, in certain situations, such as when a voice comprises chords having two or more notes, the condensed view of the voice shows multiple notes on a single stave, and a stave filter may hide some of the notes, e.g., the upper ones, to generate a de-condensed stave displaying only a portion of the voice. Often, there is a 1:1 correspondence between a player and a voice, but for instruments such as a keyboard and a multi-stringed instrument, a single player may have multiple voices to play and conversely, several players may play a single voice, such as the doubling up of woodwind players playing a single woodwind voice in an orchestra. Each item of underlying musical data is assigned to a voice and to a player.

FIG. 1 illustrates the main steps in the musical data display method described herein. In step 102, a scorewriter user, such as a composer, uses the scorewriter to enter musical data during the compositional process. During the data input, a first view of the data is generated (step 104). In certain scorewriter applications, such as in Sibelius, the first view is a condensed view in which one or more staves of the score display multiple voices. The composer may use the first view to see the current state of the composition-in-progress, in a manner analogous to the way a writer uses the display of text by a word-processing application to show the current state of a text document. Subsequently, or simultaneously in real-time during the input of musical data, a user of a scorewriter application defines a stave filter (step 106) to decondense the stave. The stave filter may be defined in a number of ways, which are described below. The scorewriter application applies the stave filter to the first view to generate a second view of the musical data of the composition (step 108). In the second view, at least one of the musical element types displayed in the first view is hidden. In general, hiding an element type in the second view involves hiding all the items corresponding to a given element type that are displayed in the first view. For example, a stave filter for notes of a given voice hides all the notes of the given voice over the portion of a stave for which the filter is defined. The scorewriter displays the second view of the musical data either in addition to the first view or instead of the first view (step 110).

Stave filters may be applied to an entire stave, or they may be applied to a portion of a stave defined by a start location and an end location. In various implementations, a user defines a filter for an entire stave by selecting a portion of the score via keyboard shortcuts, mouse input, or touch gestures, and then applying the defined stave filters to that selection via dedicated commands. Filters to be applied to multiple staves may be defined by placing a box over multiple staves, such as by clicking and dragging a mouse such that the vertical dimension of the box spans more than one stave. A given filter may be expanded and retracted or moved anywhere on a musical score.

Figure 2:
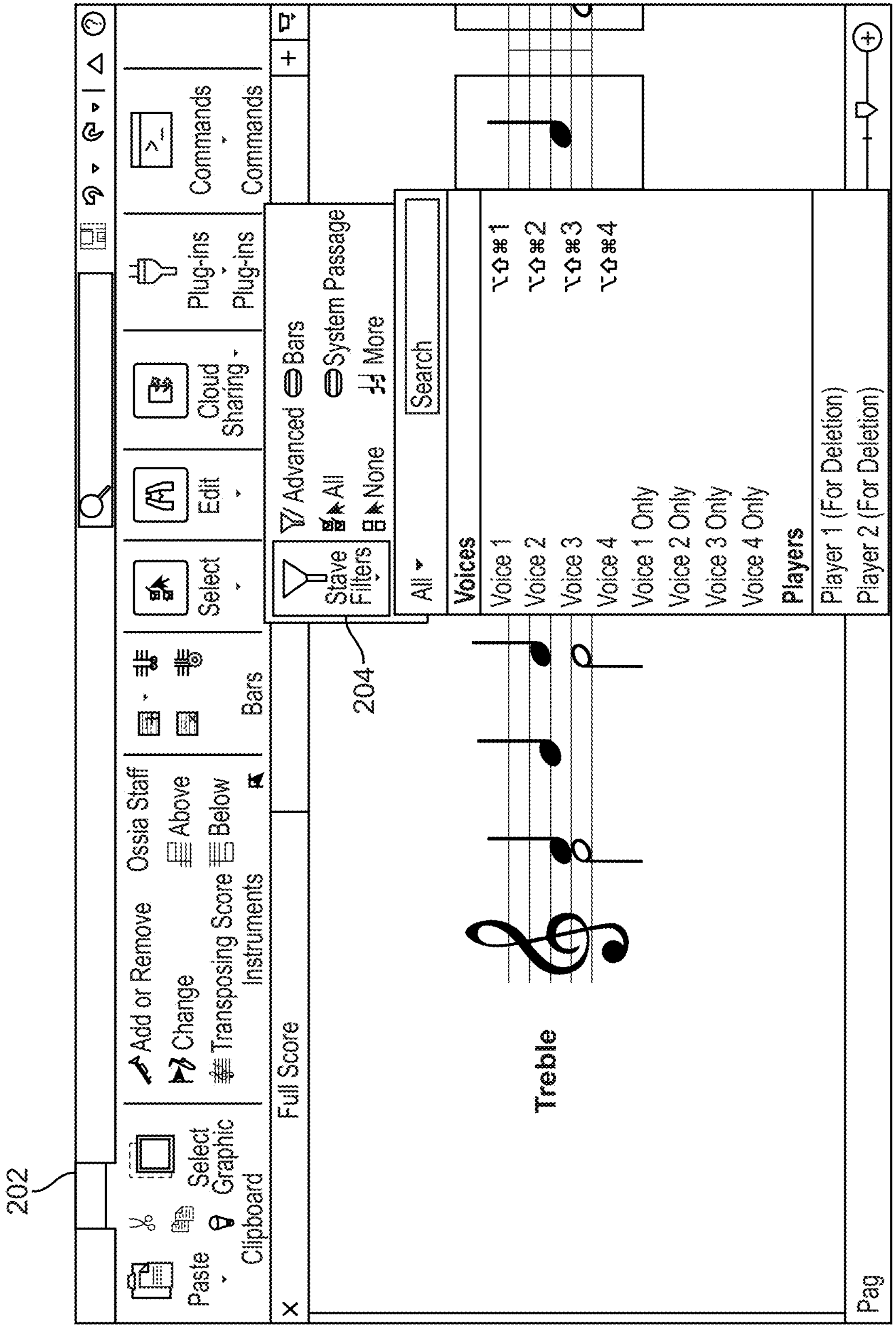
FIG. 2 is a diagrammatic screenshot of part of a user interface of a scorewriter application that features stave filters.

FIG. 2 shows diagrammatic screenshot 202 of part of a user interface of a scorewriter application that features stave filters. As part of filter-defining step 106, the user selects stave filters 204 from a drop-down menu. A further drop-down menu enables a user to select the type of filter desired. For example, selection of the "Voice 1" option specifies a filter that filters out or hides voice 1. Alternatively, rather than specifying the filter by the one or more voices it filters out, the filter may be specified by what it leaves in. For example, selection of "Voice 1 Only" results in a filtered stave that only displays voice 1.

Once a stave filter has been added to a project, the user may change its type, for example by adding another voice that is to be filtered or changing the filter definition from a subtractive one that specifies one or more voices to be hidden to one that specifies one or more voices to remain in the filtered stave. Separately, the user may also change the temporal range over which the filter applies.

Figure 3:
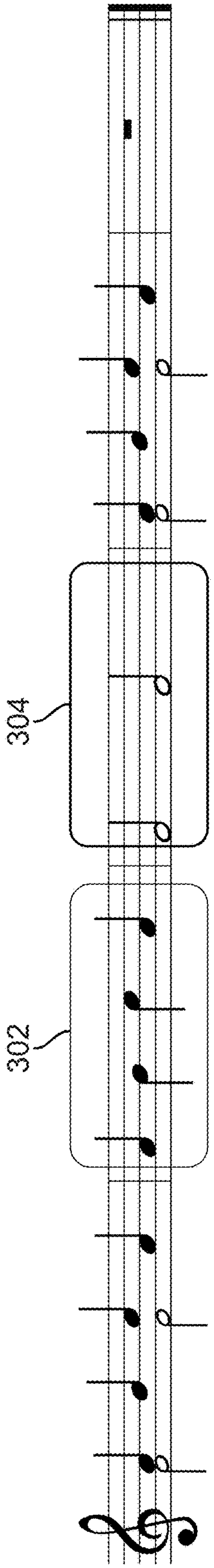
FIG. 3 illustrates the effect of applying stave filters to a condensed stave with two voices.

FIG. 3 illustrates the effect of applying stave filters to a condensed stave with two voices. The underlying musical data are the same for each of the four measures. First filter 302 has been applied to the second measure to filter out the lower voice, which is displayed in the unfiltered portions of the stave shown in the first and fourth measures with stems pointing downwards. Second filter 304 has been applied to the third measure to filter out the upper voice, which is displayed in the condensed stave with stems pointing upwards. The temporal extent of the filters is defined by the locations of the left and right edges of the boxes that denote the filters.

Figure 4:
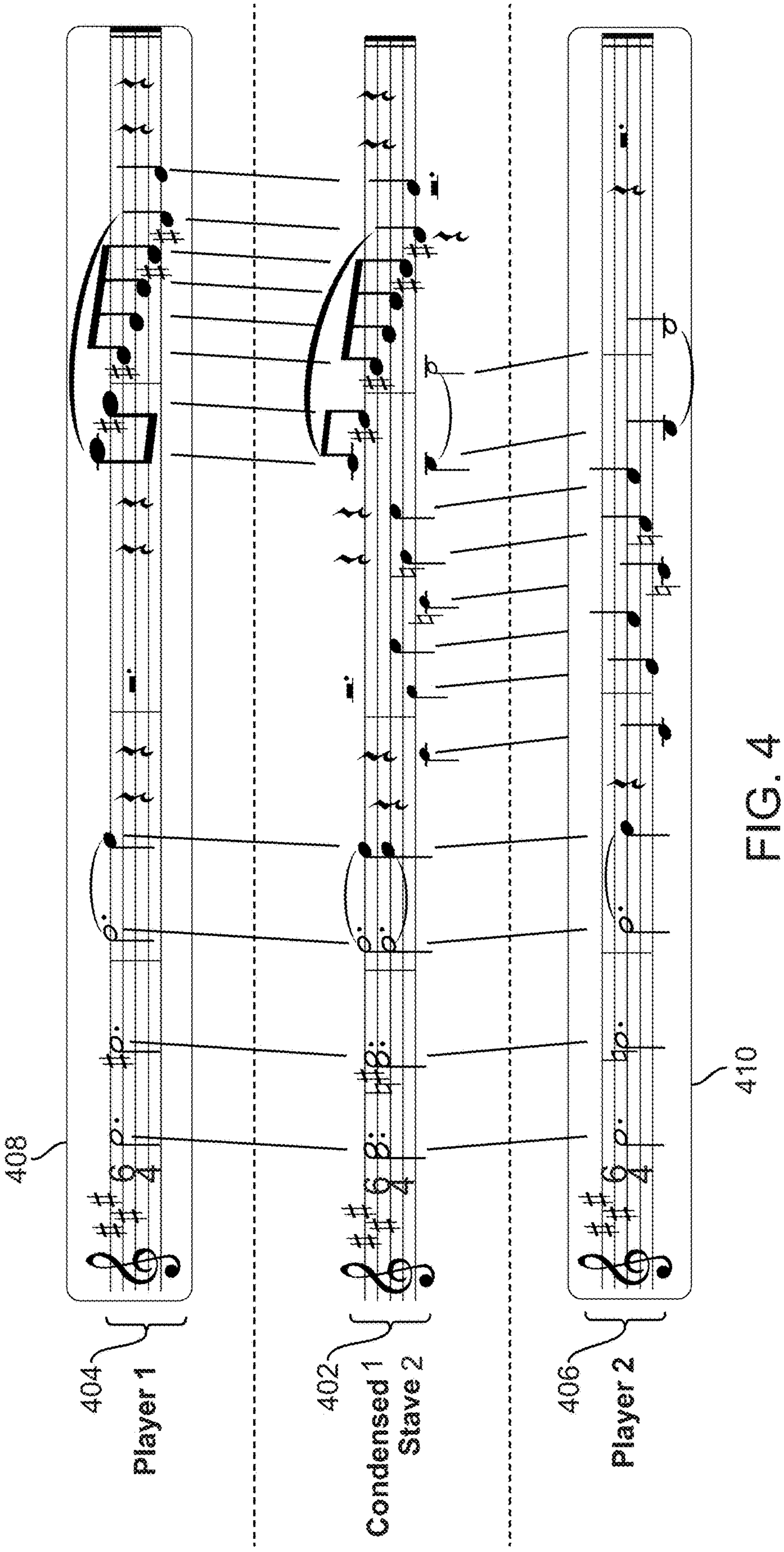
FIG. 4 illustrates the use of stave filters to generate de-condensed staves from a condensed stave.

FIG. 4 illustrates the use of stave filters defined for entire condensed stave 402 to de-condense a two-voice condensed stave into de-condensed staves 404 and 406, each de-condensed stave representing a part for a single player. In various implementations, the user first creates additional staves linked to the condensed stave, one additional stave for each of the required de-condensed staves. Initially, each of the linked staves displays the same musical data as the de-condensed stave. The user then selects a linked stave (or portion of a stave) to which the filter is to be applied. For the example illustrated in FIG. 4, condensed stave 404 for voice 1 (upper voice) is generated by applying a filter that hides the voice 2 (lower voice) of condensed stave 402. Similarly, de-condensed stave 406 for voice 2 is generated by applying filter 410 that hides voice 1. Note that, based on the musical context, the upper and lower notes displayed in the first half of stave 402 may be referred to as a single voice with upper and lower notes, while the second half would comprise an upper and a lower voice. Thus, the first half of the FIG. 4 passage indicates the filtering of a single chordal voice into two de-condensed staves having fewer notes (in this case just one) of the chord.

Figure 5:
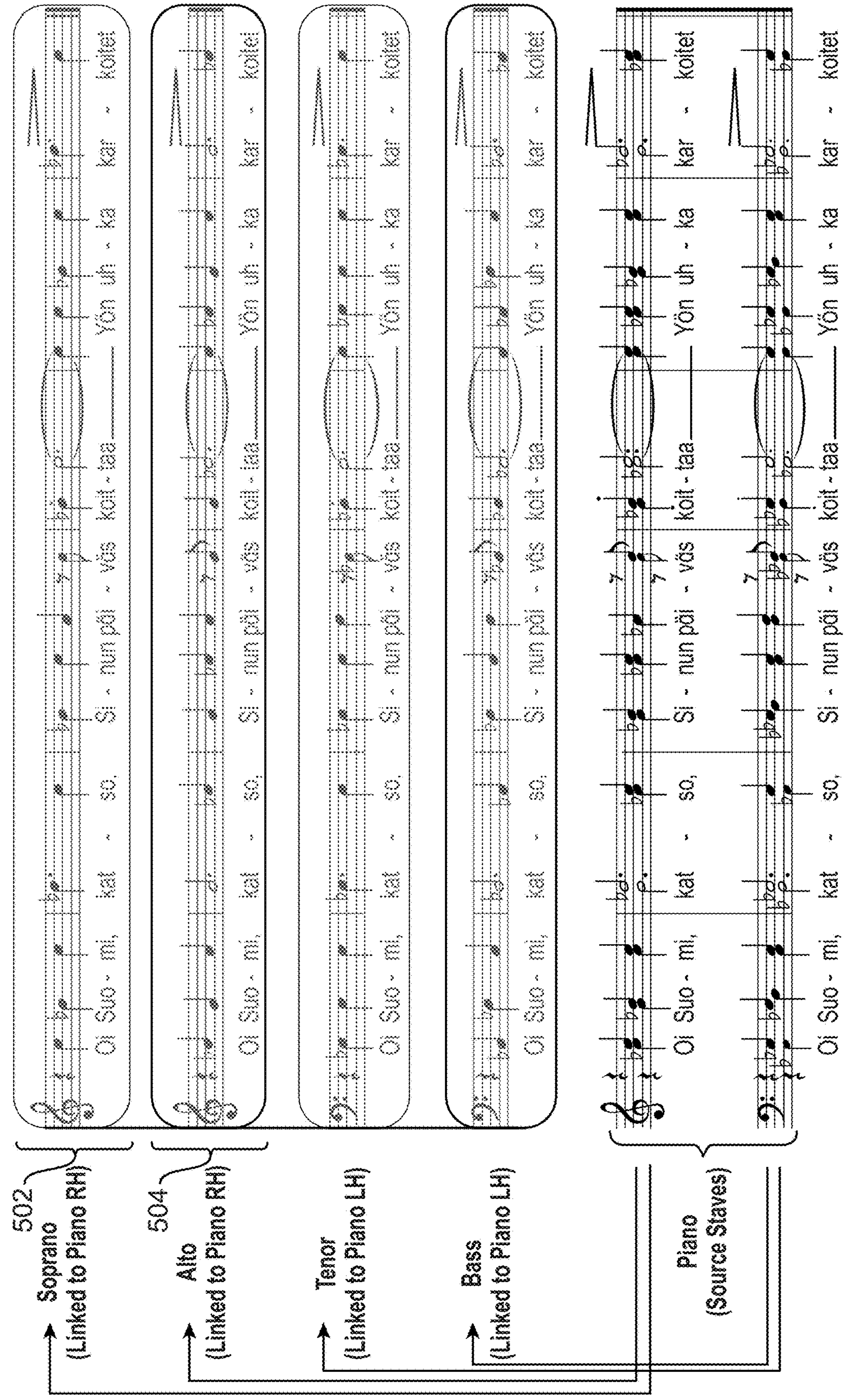
FIG. 5 illustrates the use of stave filters to generate linked de-condensed staves from a piano part that includes two staves with two voices in each stave.

FIG. 5 illustrates the use of stave filters with a pair of condensed staves, in this case staves for the left and right hands of a piano player. The figure illustrates the linkages between each of the condensed staves and their linked de-condensed staves. Thus, de-condensed staves 502 and 504 are linked to the piano right hand, with 502 having a filter that hides voice 2 of the right hand and 504 having a filter that hides voice 1 of the right hand.

When filters are applied to the duration of music project, the extent of the filter can grow or shrink automatically as the project is edited. In this case, the filters may be applied as a state to a stave and thus be applied to incoming musical objects. Without such stave filters, the user is only able to manipulate existing linked data, and any additional data would need to be manipulate and customized as well.

When a condensed stave is de-condensed, the way in which the musical objects are displayed may need to change in order to appear as valid music notation. In some cases, changes may be needed to make the music more readable or to conform to stylistic conventions. In various implementations, stave filters filter the music in an intelligent fashion so as to generate valid, readable, and stylistically consistent de-condensed staves. This may involve taking account of nuances as to how musical objects function and how they may impact the surrounding context. This may cause a filter to redraw a musical object that would otherwise be missing a beginning, a middle, or an end. Several examples of intelligent filtering are described next.

Figure 6:
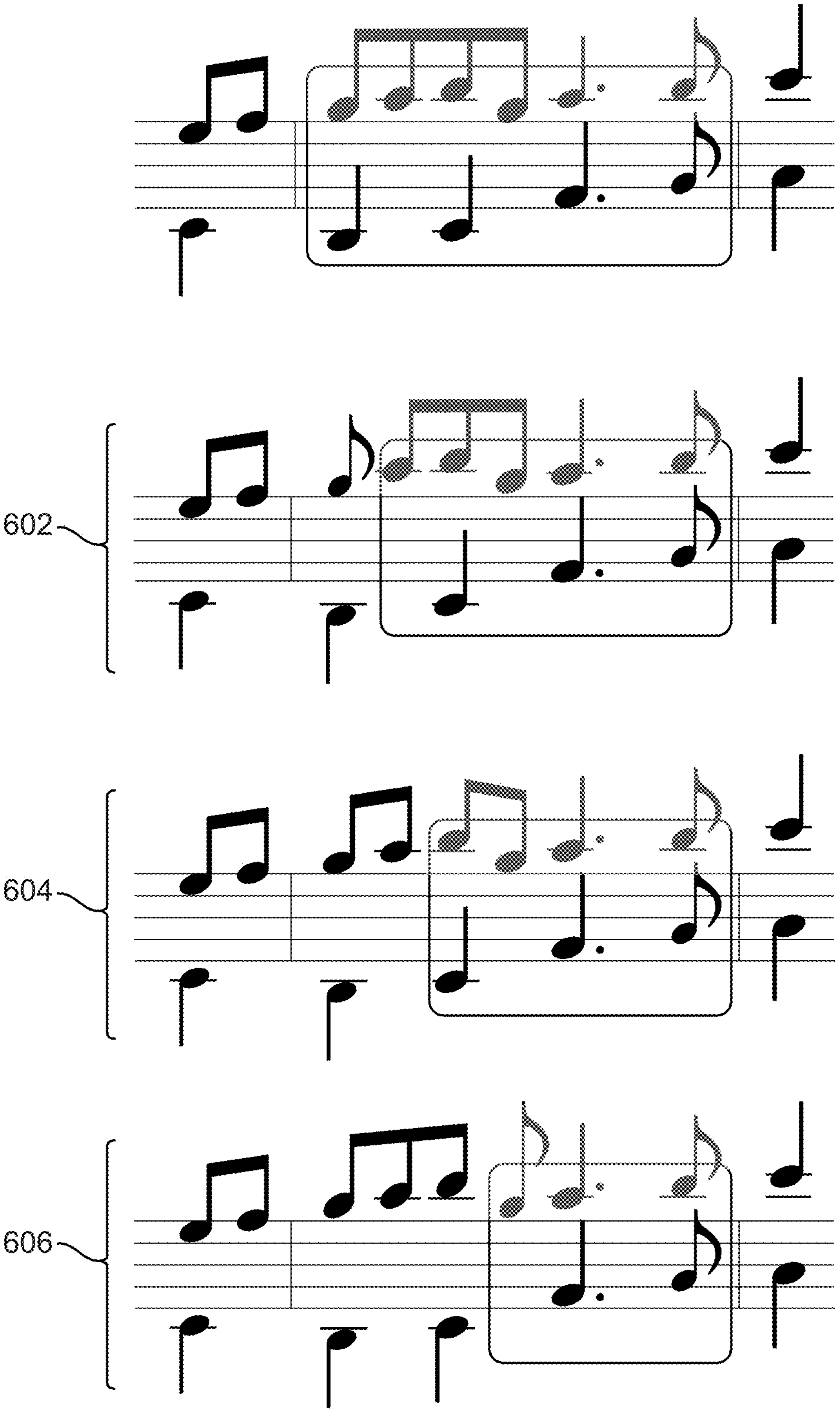
FIG. 6 illustrates the behavior of an intelligent stave filter when filtering a portion of a group of beamed $8^{th}$ notes.

FIG. 6 illustrates the behavior of an intelligent stave filter when filtering a portion of a group of beamed $8^{th}$ notes. In FIG. 6, the stippled notes have been hidden by the filter. The figure shows the effect of successively delaying the onset of the filter by one $8^{th}$ note on the way the beams in the unfiltered portion adjacent to the filter are drawn. The beams are drawn in isolation (stave 602) or beamed together (staves 604 and 606) depending on the starting location of the filter.

Figure 7:
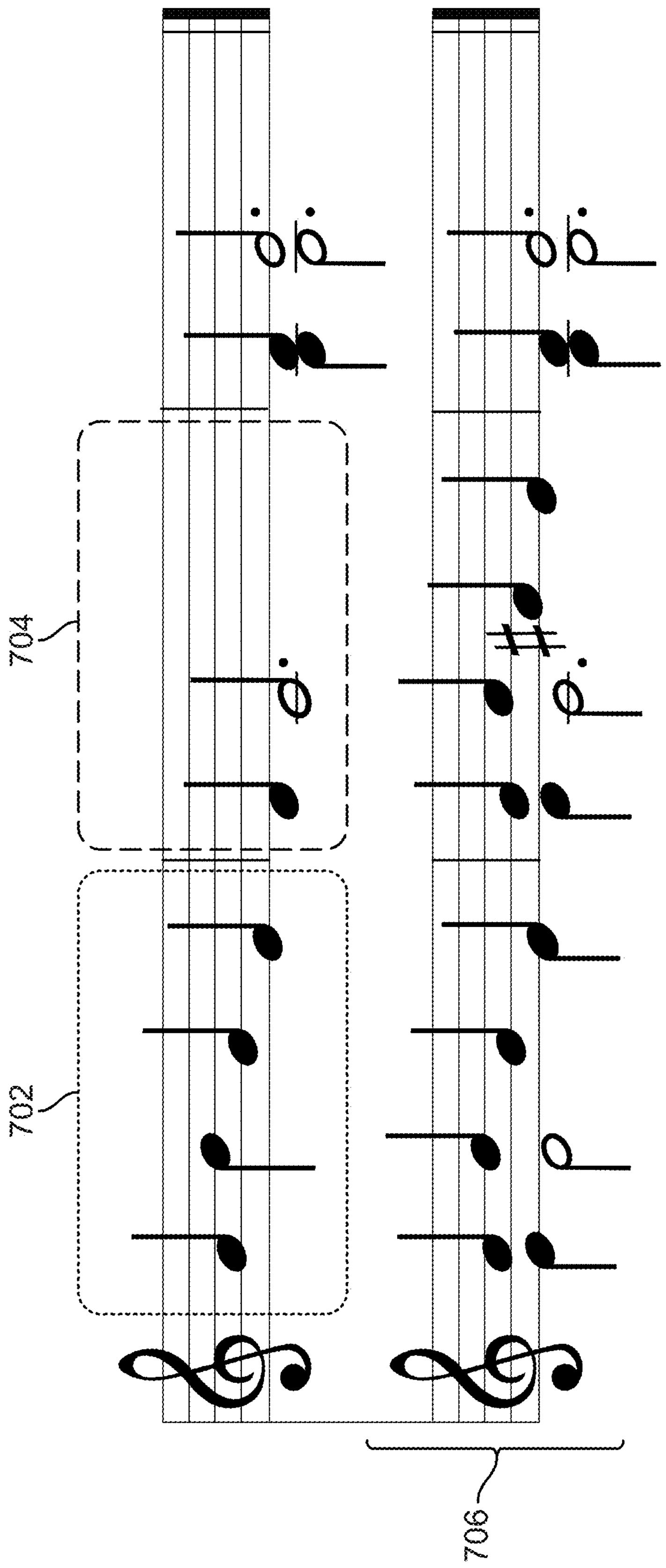
FIG. 7 shows two stave filters on a single stave in which stave filters cause the stem direction of notes to be switched to make the music more readable or stylistically correct following the filtering out of a voice.

FIG. 7 illustrates an example in which a stave filter causes the stem direction of notes to be switched when they would be more readable or stylistically correct following the application of a voice filter. The figure shows sequential filters 702 and 704 that hide the lower voice and the upper voice respectively of condensed stave 706. Filter 702 has inverted the stem direction of the second quarter note and filter 704 has inverted the stem directions of both notes within its range.

Figure 8:
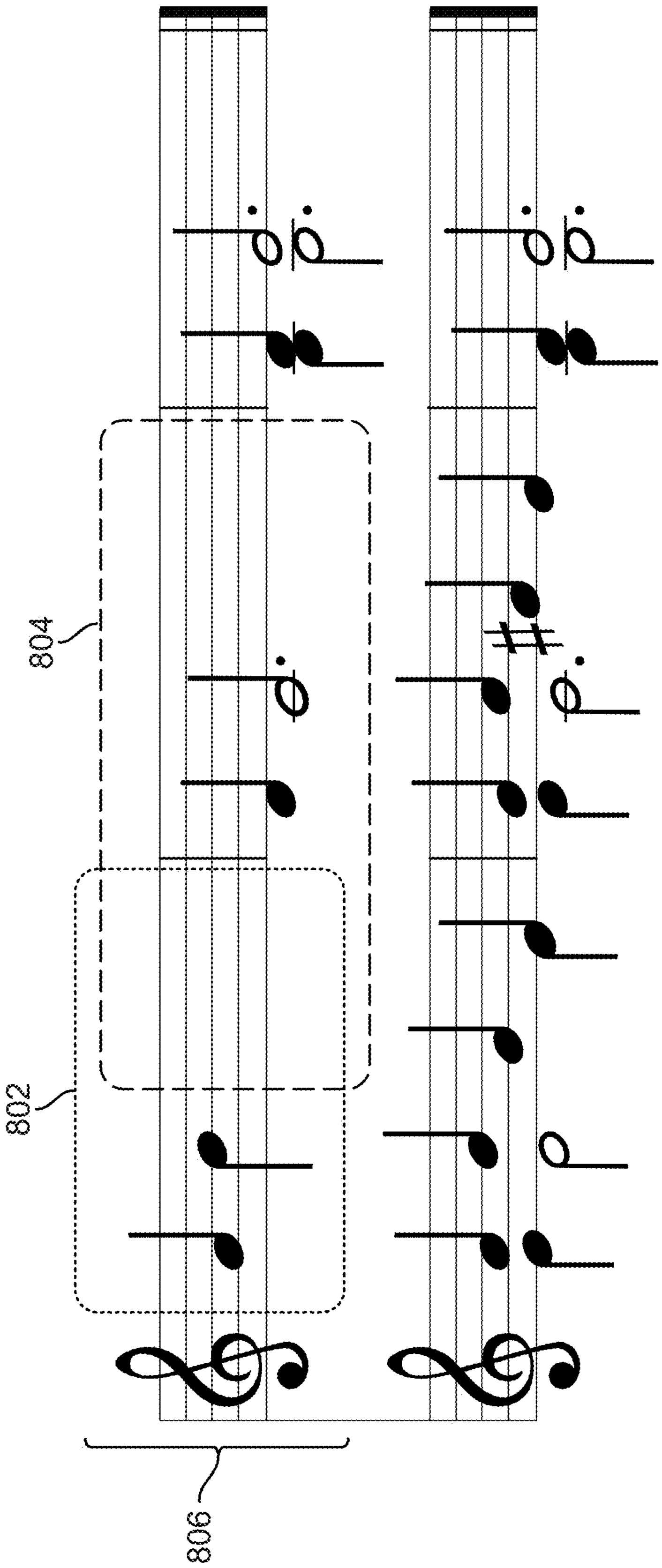
FIG. 8 shows an example of overlapping filters.
Figure 9:
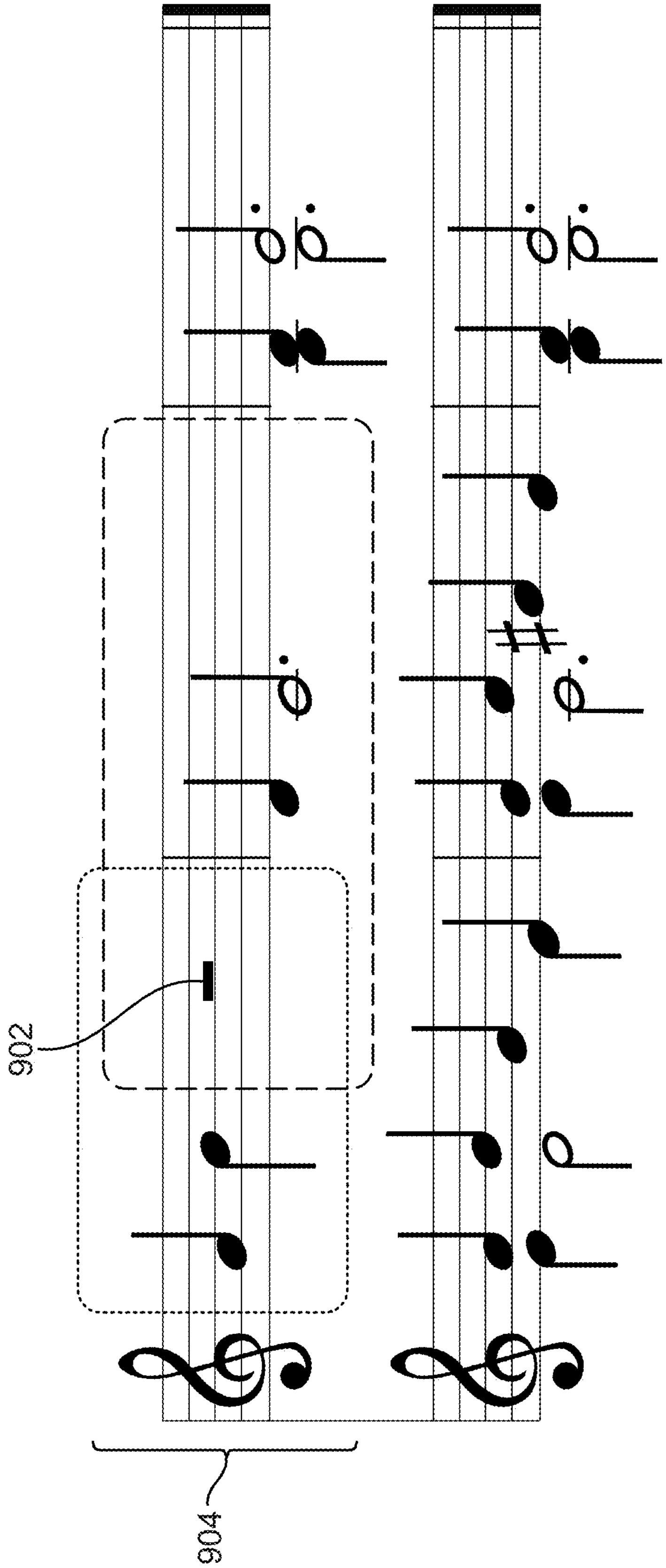
FIG. 9 shows the automatic addition of a musical rest in a filtered stave.

FIG. 8 shows an example of overlapping filters using the same underlying music data and filter types as the example illustrated in FIG. 7. However, in this example, second filter 804 has been extended so that its start location overlaps with first filter 802. In the implementation illustrated in the figure, the filters are applied additively, such that both voices are hidden in the overlapping region. In the implementation illustrated in FIG. 9, which shows the same underlying musical data and filters as in FIG. 8, the empty space in the filter overlap region of stave 806 is replaced with musical rest 902. This results in de-condensed stave 904 that is musically valid.

Figure 10:
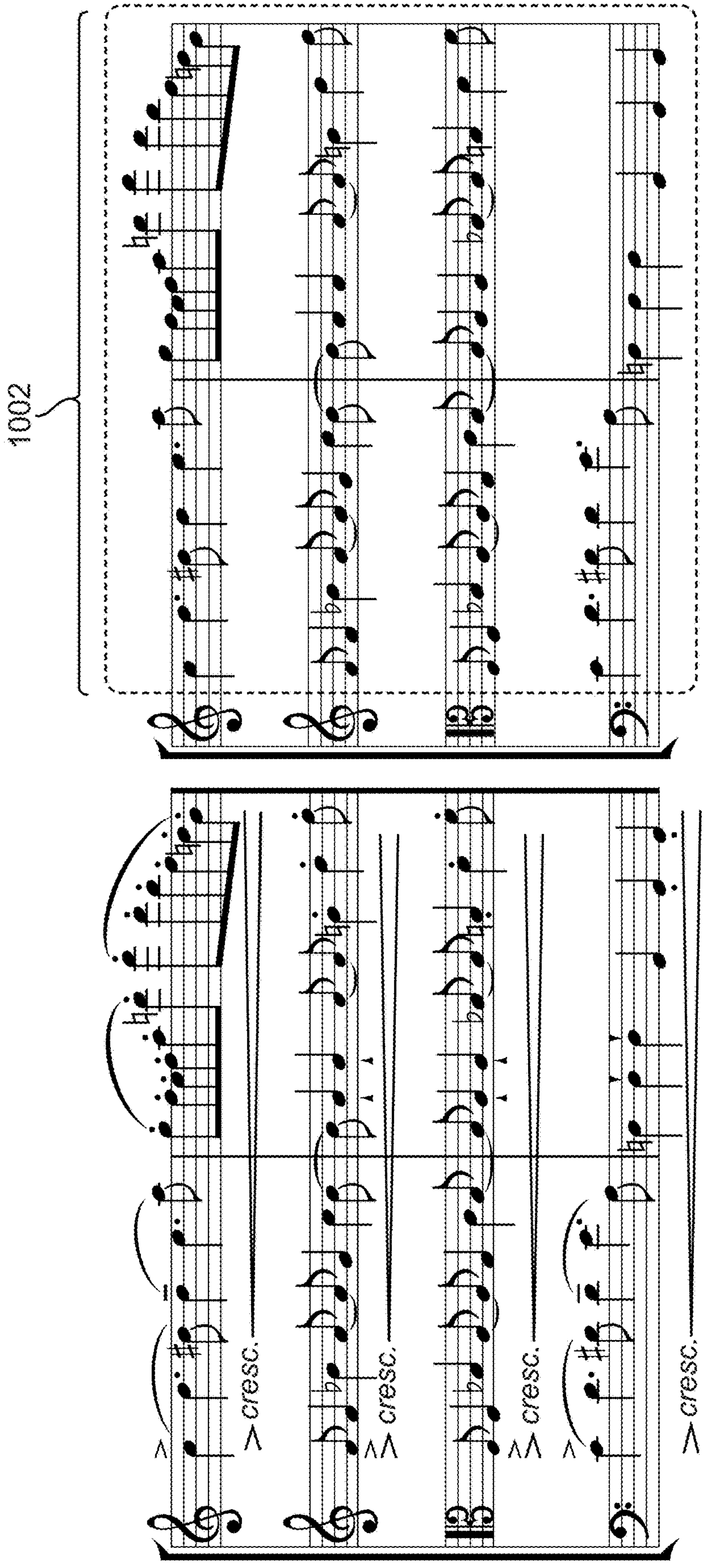
FIG. 10 illustrates the application of a filter to multiple staves.

Filters may be applied across multiple staves. In various implementations, the user is able to define multi-stave filters by drawing a box covering more than one stave. In such implementations, the top and bottom boundaries of a rectangular filter box define the one or more staves to be included in a filter, and the left and right boundaries of the filter box define the temporal start and end locations respectively of the filter. FIG. 10 illustrates the application of a filter to multiple staves. The unfiltered data are shown at left. Single multi-stave filter 1002 has been applied to the entire passage. The filter removes all note articulation and dynamics, which includes slurs, staccato and emphasis marks, and text and hairpin dynamic marks. This example also illustrates the use of non-note stave filters, i.e., filters that filter out one or more sets of non-note musical objects in the underlying project music data. In one use case, the hiding of certain non-note marks may make a musical passage easier to perform for less experienced players.

Figure 11:
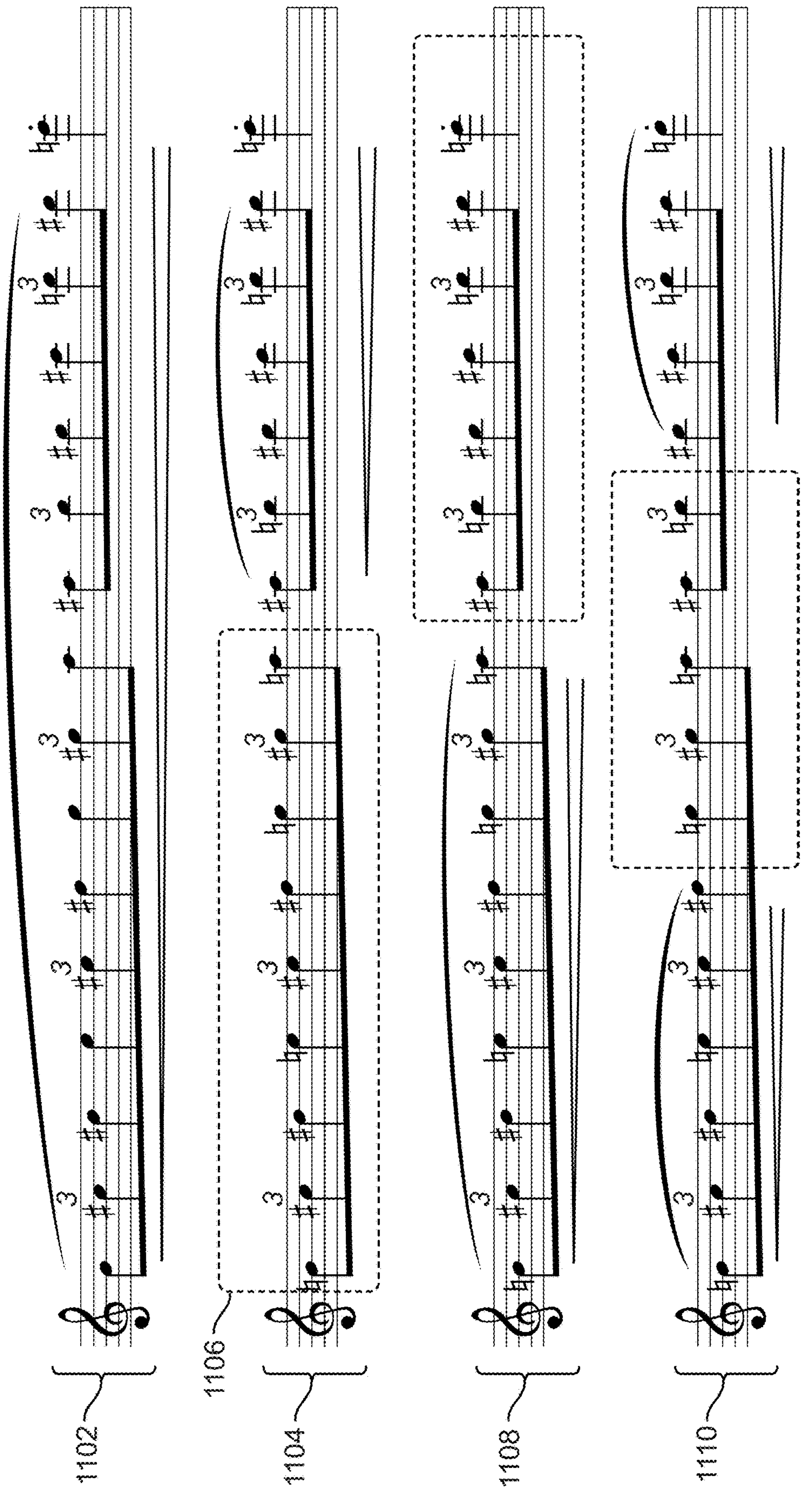
FIG. 11 illustrates an example of a non-note filter that takes account of stylistic nuances in the display of non-note musical objects.

FIG. 11 illustrates how a non-note filter may take account of stylistic nuances in the display of non-note musical objects. The unfiltered data are shown in top stave 1102. In stave 1104, filter 1106 is applied to the first half of the measure to remove the note articulation and dynamics, as for the filter illustrated in FIG. 10. However, in this case, the hairpin and slur are redrawn so as to start in the middle of the measure at the beginning of the unfiltered portion. Knowledge of the musical context and the way such non-note musical objects are displayed enables the filter to display these objects with musically and stylistically appropriate notation. In stave 1108, a filter is applied to the end of the measure, and the slur and hairpin are redrawn correctly for the unfiltered first half of the measure. In stave 1110, the filter is applied to a middle portion of the stave. In the implementation illustrated in the figure, each of the unfiltered portions are displayed with their own redrawn hairpin and slur. In certain musical contexts, the filter may instead draw a shortened hairpin in the unfiltered portion at the beginning of the measure, without a second hairpin at the end of the measure.

Aspects that may be considered when a note object is placed under a filter include the placement of stem direction, the placement of rhythm dots, line geometries, articulation visibility and position, note brackets, beam angles and groupings, arpeggio lines lengths, tremolo line lengths, ledger line visibility and color/shading, tab stave lines, and accidentals including downstream accidentals.

Stave filters may be used in a variety of use cases. In one widely applicable use, as already discussed above, stave filters are used to generate individual parts for players of chamber music or orchestral music when the master composition is in the form of a condensed score. In choral music, stave filters may case the production of separate parts for soprano, alto, tenor, and bass singers, as well as create a piano reduction score. In this case, the piano acts as a condensed stave that contains all the musical data for the soprano, alto, tenor, and bass voices. When these data are linked and filtered with stave filters, the data can be manipulated on any of the linked staves and the effects will be seen on all staves, resulting in considerable time and efficiency improvements. When a score is being orchestrated, filters may provide a valuable tool for rapidly previewing alternative orchestrations, such as when an arranger wishes to filter out tonal density. Film music mockups are one example in which music may need to be reduced or expanded for different ensemble sizes. A composer working with a digital audio workstation may often chunk many harmonic notes onto a single track, and when these tracks are translated into music notation, stave filters and linked staves can serve as an efficient tool for rearranging these harmonies onto multiple music staves.

It may be desirable to reduce the complexity of a composition so that less experienced musicians can play it. In this context, stave filters may be used to filter out shorter duration notes. Similarly, other filters may reduce melodic complexity, such as by filtering out ornamentation and articulation. When an urtext edition or other original edition of a work is required, stave filters may be used to filter out information added to a score by editors. Stave filters may also be used to remove various components of harmony in a composition, such as by removing chordal 3rds or extensions beyond chordal 7ths. Removing chordal 7ths may reduce complexity for the audience and could also help with arranging a piece into a different genre, such as from jazz to pop. Removing chordal 3rds may be useful when rearranging some types of music into a rock or grunge genre. A stave filter that removes bar lines and/or stave lines may be applied to facilitate free-form writing, such as for a cadenza.

Scorewriters or other music composition applications featuring stave filters may be implemented on a desktop system or on a mobile device such as a tablet or smartphone. Various implementations are implemented on web browsers and may be made available to users as software as a service (SaaS).

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, OLED displays, various stereoscopic displays including displays requiring viewer glasses and glasses-free displays, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen/stylus and tablet, touchscreen, camera, communication device, musical keyboard, microphone, and free-form data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of displaying musical data, the method comprising:

at a scorewriter software application, receiving musical data representing a musical project;

using the scorewriter software application to display the received data as a first view of the musical data, wherein the first view incudes a stave displaying a plurality of element types of the musical project;

enabling a user of a scorewriter software application to define a first filter to be applied to the first view of the musical data, wherein:

application of the first filter generates a second view of the musical data by removing from the first view a first element type of the plurality of element types of the musical data that is displayed in the first view; and the plurality of element types includes a plurality of musical voices and the first element type is one or more of the plurality of voices; and using the scorewriter software application to:

apply the first filter to the first view of the musical data to generate the second view of the musical data; and display the second view of the musical data.

2. The method of claim 1, wherein the first element type is a part of a multi-note voice.

3. The method of claim 1, wherein the first element type is a non-note type.

4. The method of claim 3, wherein the non-note type is at least one of articulation and dynamics.

5. The method of claim 1, wherein the first filter applies to a temporal interval comprising a portion of a temporal duration of the musical project.

6. The method of claim 1, wherein the first filter applies to a duration of the musical project, and a duration of the first filter is automatically changed to match the duration of the musical project when the duration of the musical project is changed.

7. The method of claim 1, further comprising enabling the user to define a second filter to be applied to the first view, wherein application of the second filter removes from the first view a second element type of the plurality of element types.

8. The method of claim 7, wherein the second filter overlaps the first filter and both the first element type and the second element type are removed in the second view where the first and second filters overlap.

9. The method of claim 1, wherein the first view includes a plurality of staves, and the first filter is defined to be applied to the first view of two or more staves of the plurality of staves.

10. The method of claim 1, wherein the first view is a condensed stave displaying musical voices for a plurality of players and application of the first filter generates a second view corresponding to a musical part for a subset of the plurality of players.

11. The method of claim 1, wherein the first view comprises one of a right hand and a left hand of a piano arrangement and the second view comprises a part for one of a soprano, alto, tenor, and bass singer.

12. The method of claim 1, wherein the first view comprises an edited edition of one or more staves of the musical project and application of a plurality of filters to the first view generates a view comprising an urtext edition of the one or more staves.

13. The method of claim 1, wherein the first view includes one or more staves of an orchestral score, and application of a plurality of filters to the first view generates a view of an alternative orchestration.

14. The method of claim 1, wherein the second view displays at least one note that is stylistically changed with respect to display of the at least one note in the first view.

15. The method of claim 14, wherein the stylistic change includes one of a note stem direction, note beam grouping, note beam angle, and note brackets.

16. The method of claim 1, wherein the second view displays a non-note element that is stylistically changed with respect to the display of the non-note element in the first view.

17. The method of claim 16, wherein the stylistic change includes one of a placement of rhythm dots, visibility of note articulation, dimension and placement of crescendo and decrescendo hairpins, arpeggio line length, tremolo line length, ledger line visibility, placement of tab stave lines, and visibility of accidentals.

18. The method of claim 1, wherein at least one musical element that was not present in the first view is automatically added to the second view in order to make the second view musically valid.

19. The method of claim 18, wherein the at least one musical element is a rest.

20. A method of displaying musical data, the method comprising:

at a scorewriter software application, receiving musical data representing a musical project;

using the scorewriter software application to display the received data as a first view of the musical data, wherein the first view incudes a first stave displaying a plurality of element types of the musical project, the plurality of element types including a plurality of musical voices; and enabling a user of a scorewriter software application to:

create a second stave linked to the first stave and displaying the first view of the musical data;

select a portion of the second stave; and select a filter to be applied to the selected portion of the second stave, wherein application of the filter by the scorewriter software application removes from view in the second stave a first element type of the plurality of element types of the musical data that is displayed in the first view, wherein the first element type is one or more of the plurality of musical voices.

21. The method of claim 20, wherein the first stave is a condensed stave that displays a plurality of musical voices and application of the filter to the second stave generates a de-condensed stave that displays a subset of the plurality of musical voices.

22. A scorewriter computer program product comprising:

a non-transitory computer-readable medium with computer-readable instructions encoded thereon, wherein the computer-readable instructions, when processed by a processing device instruct the processing device to perform a method of displaying musical data, the method comprising:

receiving musical data representing a musical project;

displaying the received data as a first view of the musical data, wherein the first view incudes a stave displaying a plurality of element types of the musical project;

enabling a user of the scorewriter computer program product to define a first filter to be applied to the first view of the musical data, wherein:

application of the first filter generates a second view of the musical data by removing from the first view a first element type of the plurality of element types of the musical data that is displayed in the first view, and the plurality of element types includes a plurality of musical voices and the first element type is one or more of the plurality of voices;

applying the first filter to the first view of the musical data to generate the second view of the musical data; and displaying the second view of the musical data.

23. A system comprising:

a memory for storing computer-readable instructions; and a processor connected to the memory, wherein the processor, when executing the computer-readable instructions, causes the system to perform a method displaying musical data, the method comprising:

at a scorewriter software application executing on the system, receiving musical data representing a musical project;

using the scorewriter software application to display the received data as a first view of the musical data, wherein the first view incudes a stave displaying a plurality of element types of the musical project;

enabling a user of a scorewriter software application to define a first filter to be applied to the first view of the musical data, wherein:

application of the first filter generates a second view of the musical data by removing from the first view a first element type of the plurality of element types of the musical data that is displayed in the first view; and the plurality of element types includes a plurality of musical voices and the first element type is one or more of the plurality of voices;

using the scorewriter software application to:

apply the first filter to the first view of the musical data to generate the second view of the musical data; and display the second view of the musical data.

* * * * *